US012730749B1

(12) United States Patent
Li et al.

(10) Patent No.: US 12,730,749 B1
(45) Date of Patent: Sep. 8, 2026

(54) HARDWARE DESCRIPTOR MAPPING

(71) Applicant: QUALCOMM Incorporated, San Diego, CA (US)

(72) Inventors: Liang Li, San Diego, CA (US); Andrew Evan Gruber, Arlington, MA (US); Zhihong Wang, San Diego, CA (US); Jonathan Wicks, Lafayette, CO (US); Heng Qi, San Diego, CA (US); Jiexia Yu, San Diego, CA (US); Thomas Edwin Frisinger, Shrewsbury, MA (US); Richard Hammerstone, Tyngsboro, MA (US); Srihari Babu Alla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/091,717

(22) Filed: Mar. 26, 2025

(51) Int. Cl.
*G06F 12/00* (2006.01)
*G06F 12/02* (2006.01)
*G06F 12/0811* (2016.01)

(52) U.S. Cl.
CPC ...... *G06F 12/0246* (2013.01); *G06F 12/0811* (2013.01); *G06F 2212/7201* (2013.01)

(58) Field of Classification Search
CPC .. G06F 12/0246; G06F 12/0292; G06F 12/06; G06F 12/0811; G06F 12/10
See application file for complete search history.

(56) References Cited

U.S. PATENT DOCUMENTS

2015/0089146 A1* 3/2015 Gotwalt .................... G06T 1/60
711/133
2019/0079955 A1* 3/2019 Kato ...................... G06T 11/60
2024/0419341 A1 12/2024 Shin
2025/0094356 A1 3/2025 Yadavalli

FOREIGN PATENT DOCUMENTS

CN 110858180 A 3/2020

OTHER PUBLICATIONS

International Search Report and Written Opinion—PCT/US2026/014512—ISA/EPO—May 13, 2026O).
Lubart BP., et al., "Procedure for Transient Area of Address Translation Table in Multiprogramming System", IP.com Journal, Prior Art Database, Technical Disclosure, Nov. 1, 1981, 3 Pages, XP013043483, The Whole Document.

* cited by examiner

*Primary Examiner* — Shawn X Gu
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for hardware descriptor mapping. A graphics processor may generate a resource descriptor having a dummy memory address associated with a resource object. The graphics processor may store the dummy memory address to a look-up table (LUT). The graphics processor may obtain a real memory address associated with the resource object. The graphics processor may update the LUT with the obtained real memory address in a table entry associated with the dummy memory address.

20 Claims, 10 Drawing Sheets

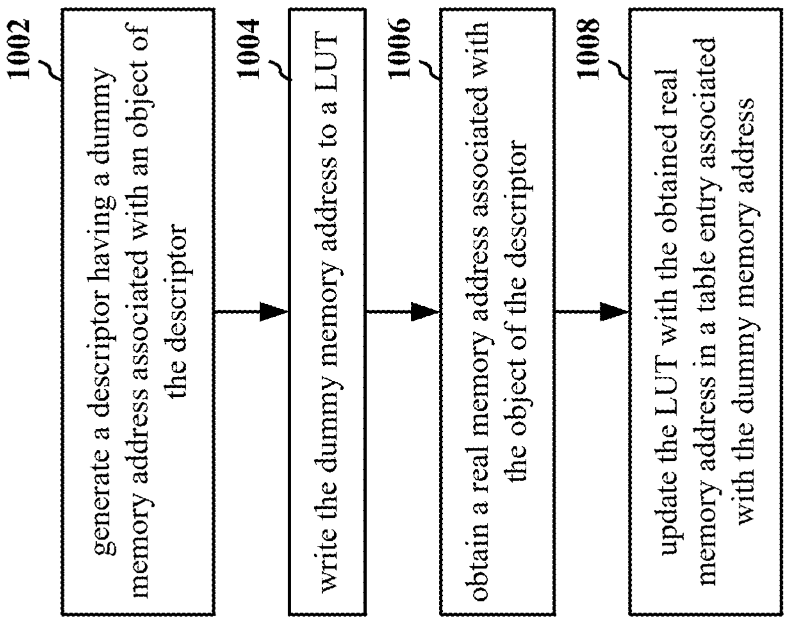
FIG. 10
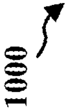

HARDWARE DESCRIPTOR MAPPING

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address efficient mapping of descriptor addresses when memory allocation is delayed by design. There is a need for improved descriptor memory mapping techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory; and at least one processor coupled to the memory and, based at least in part on information stored in the memory, the at least one processor may be configured to generate a resource descriptor having a dummy memory address associated with a resource object. The at least one processor may be configured to store the dummy memory address to a look-up table (LUT). The at least one processor may be configured to obtain a real memory address associated with the resource object. The at least one processor may be configured to update the LUT with the obtained real memory address in a table entry associated with the dummy memory address.

In some aspects, the techniques described herein relate to a method of graphics processing, including: generating a resource descriptor having a dummy memory address associated with a resource object; storing the dummy memory address in a look-up table (LUT); obtaining a real memory address associated with the resource object; and updating the LUT with the obtained real memory address in a table entry associated with the dummy memory address.

In some aspects, the techniques described herein relate to a method, where updating the LUT with the obtained real memory address in the table entry associated with the dummy memory address includes: updating the LUT with the obtained real memory address after storing the dummy memory address to the LUT.

In some aspects, the techniques described herein relate to a method, further including: obtaining an indication of the dummy memory address; determining the real memory address based on the table entry of the LUT associated with the dummy memory address in response to the obtained indication; and retrieving resource data associated with the resource descriptor based on the determined real memory address.

In some aspects, the techniques described herein relate to a method, where determining the real memory address based on the table entry of the LUT associated with the dummy memory address includes: reconstructing the real memory address based on a source field of the table entry and a destination field of the table entry.

In some aspects, the techniques described herein relate to a method, further including: determining that a set of most significant bits (MSBs) of the source field of the table entry are not all set, where reconstructing the real memory address based on the source field of the table entry and the destination field of the table entry includes: reconstructing the real memory address based on the source field of the table entry and the destination field of the table entry in response to the determination that the set of MSBs of the source field of the table entry are not all set.

In some aspects, the techniques described herein relate to a method, further including: outputting the dummy memory address for storage in a second memory before the obtainment of the indication of the dummy address.

In some aspects, the techniques described herein relate to a method, where storing the dummy memory address to the LUT includes: storing the dummy memory address in a set of least significant bits (LSBs) of a source field of the table entry; and setting a set of most significant bits (MSBs) of the source field of the table entry, where the set of LSBs do not overlap with the set of MSBs.

In some aspects, the techniques described herein relate to a method, further including: updating the LUT with the obtained real memory address in the table entry associated with the dummy memory address includes: updating the set of MSBs of the source field of the table entry with a first portion of the obtained real memory address; and updating a destination field of the table entry with a second portion of the obtained real memory address.

In some aspects, the techniques described herein relate to a method, further including: outputting an indication of the updated LUT with the obtained real memory address.

In some aspects, the techniques described herein relate to a method, where outputting the indication of the updated LUT with the obtained real memory address includes: transmitting the indication of the updated LUT with the obtained real memory address; or storing the indication of the updated LUT with the obtained real memory address.

In some aspects, the techniques described herein relate to a method, where updating the LUT with the obtained real memory address in the table entry associated with the dummy memory address includes: updating the LUT with a set of indicators related to the resource descriptor, where the set of indicators include at least one of: an indicator of an object type; or an indicator of an object size.

In some aspects, the techniques described herein relate to a method, further including: updating a resource content based on the obtained real memory address in response to a determination that the resource descriptor is loaded into a hardware.

In some aspects, the techniques described herein relate to a method, further including: processing a resource associated with the resource descriptor; storing the processed resource based on the obtained real memory address, where updating the LUT with the obtained real memory address in the table entry associated with the dummy memory address includes: updating the LUT with the obtained real memory address in the table entry associated with the dummy memory address in response to processing the resource associated with the resource descriptor.

In some aspects, the techniques described herein relate to a method, further including: generating a second resource descriptor having a second dummy memory address associated with a second resource object; storing the second dummy memory address the LUT; and refraining from updating a second table entry of the LUT associated with the second dummy memory address.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flowchart of an example method of graphics processing in accordance with one or more techniques of this disclosure.

DETAILED DESCRIPTION

Figure 1:
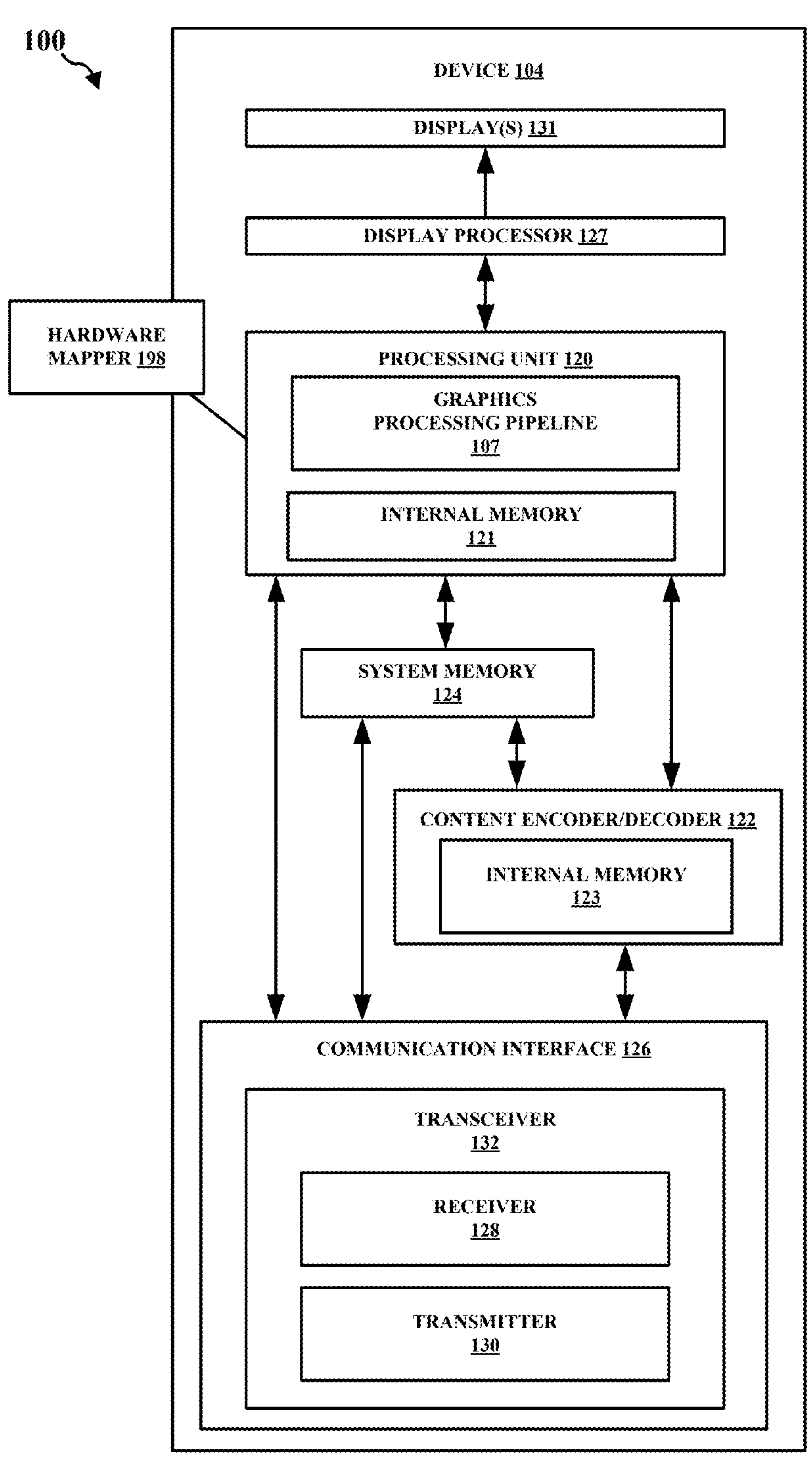
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

The following description is directed to examples for the purposes of describing innovative aspects of this disclosure. However, a person having ordinary skill in the art may recognize that the teachings herein may be applied in a multitude of ways. Some or all of the described examples may be implemented in any device or system that is capable of processing graphics commands. Various aspects relate generally to reprojecting and/or composing frames for a graphics processing unit (GPU). Some aspects more specifically relate to applying reprojection fallback strategies during an excess system load (e.g., when a reprojection process for a frame will not complete in time to display the frame). For example, a graphics system may have limited dynamic random access memory (DRAM) bandwidth due to concurrent work (e.g., rendering, GPU workload, high-intensity periods of camera data acquisition), software control latencies (e.g., poorly optimized code, latencies when communicating with third-party applications), bottlenecking hardware execution, and/or power/thermal throttling. Such loads may affect the calculated projected time for a reprojection process to complete within a threshold period of time. Use of remotely rendered framebuffers (e.g., frames processed by a reprojection topology on a separate system, or a third-party system), may also affect the time to render a frame. For example, use of a second reprojection process may conserve resources if a first reprojection process uses remote-rendered framebuffers having a high calculated latency value, or if a first reprojection process uses a large amount of bandwidth (e.g., WiFi, 5G bandwidth) and a system is configured to conserve use of that bandwidth with respect to transmission/reception of remote-rendered frames.

In some aspects, a graphics processor, for example a graphics processing unit (GPU), or a driver of the graphics processor, may generate a resource descriptor for a resource object, also referred to as a graphics object such as a texture or a buffer, without allocating memory for the resource object. In other words, the graphics system may not program the address of a lazily allocated system memory when the input attachment (e.g., a resource descriptor) is written such that the memory is not committed too early. The graphics processor may instead defer memory allocation of the graphics object to well after generation of the resource descriptor, for example during a draw or during a render of the resource object. The object described by the resource descriptor may be referred to as a resource object. The resource object may be stored on a memory of the graphics processor (e.g., graphics memory (GMEM)) or may be stored on an off-chip memory, also referred to as external memory or system memory. A resource descriptor may be a container used to store data about a resource object processed by a graphics processor. The resource object associated with the resource descriptor may also be referred to as the object of the resource. A lazily allocated system memory may refer to a portion of memory that is allocated after a resource descriptor is created with a memory address field that does not include the memory address that refers to the allocated memory. In some aspects, a graphics processor may skip memory allocation to a resource or may allocate less memory to the resource, since all or part of the related read/write traffic may be configured to be within the GPU, reducing resources used to read/write traffic to external memory, also referred to as system memory or off-chip memory. The graphics processor may patch the address by a graphics driver at the end of a command buffer recording time. Patching the address of a resource descriptor may refer to storing at least a portion of a memory address referring to allocated memory in a memory address field of the resource descriptor. At the end of a command buffer recording time, the graphics processor may determine that the processed resource object is to be stored in a memory address (e.g., an external memory address vs. a graphics memory (GMEM) address) and may then patch the address in the resource descriptor. In other words, the graphics processor may first generate a resource descriptor without a valid memory address (i.e., a memory address that is associated with allocated memory), may then allocate memory to the resource associated with an external memory address or a GMEM address, and then may write the corresponding address to the generated resource descriptor. This patching strategy may incur cost at the driver, as the driver may track the bound resource descriptor's location in order to patch it later. If the driver tracks multiple resource descriptors, these costs may be cost prohibitive. Moreover, such patching may not work for some aspects, for example update-after-binding scenarios, where a graphics processor attempts to update a resource descriptor after the command buffer is recorded, and before submission. In some aspects, the graphics processor may be able to patch during command buffer recording, but may not be able to patch after command buffer recording. In such aspects, the attempt to patch the resource descriptor after the command buffer is recorded may fail.

In some examples, a graphics processor (or graphics processor system) may generate a resource descriptor having a dummy memory address associated with a resource object. A resource descriptor may be a data structure, or container, that stores information that a graphics processor may use to access the resource object. The resource descriptor may have, for example, an object type (e.g., two-dimensional (2D) resources, three-dimensional (3D) resources), an object size (e.g., number of bytes allocated in memory), and a memory address of where the resource object is stored. A dummy memory address may be a memory address that is not associated with a memory address associated with allocated memory where resource object data may be stored. The dummy memory address may have a null value, or may have a value that is not yet associated with a memory address. In some aspects, a graphics driver may generate the dummy address associated with the resource. The graphics driver may generate all dummy memory address values within a range of values that are not shared with other allocated memory space ranges. The graphics driver may ensure that each dummy memory address is a unique value which is not shared with other allocated memory space ranges. In other words, the dummy memory address may uniquely identify the resource. The graphics processor may store the dummy memory address in a look-up table (LUT). The LUT may include a set of rows, where each row is associated with a resource descriptor, and a set of address fields where a memory address may be stored. In some aspects, a resource descriptor row may include a source memory address field, also referred to as a source field, and a destination memory address field, also referred to as a destination field. A graphics driver may store the dummy memory address the source memory address field, and leave the destination memory address field blank, or as a null value, for later when a descriptor is loaded into the hardware. The LUT may be saved on hardware memory, for example a level 1 or a level 2 cache of a graphics processor. As such, the LUT may also be referred to as a LUT hardware table. The graphics processor may obtain a real memory address associated with the resource object. A real memory address may be a memory address that references memory allocated to store object data for the resource object. The real memory address may be an on-chip memory address, such as a GMEM memory address, or may be an off-chip memory address, such as external memory, system memory, or hard disk drive memory. The graphics processor may update the LUT with the obtained real memory address in a table entry associated with the dummy memory address and the resource descriptor. The table entry may be, for example, a source field of a row in the LUT, or a destination field of a row in the LUT. The graphics processor may store the resource descriptor in a hardware internal cache of a graphics processing chip, such as a GPU. The graphics processor may utilize the LUT in the loading path of the resource descriptor to allow a graphics driver to perform the late address update after the descriptor has been generated with the dummy memory address. In other words, the late address update may allow a driver, or an application utilizing the driver, to access the resource descriptor's content without increasing driver overhead. For example, instead of tracking a resource descriptor to update the memory address of the resource descriptor later, the driver may simply generate the resource content using the dummy memory address. The driver may rely on the hardware's capability to associate that dummy address with a real system memory address. The hardware may perform this update when the hardware loads the descriptor into internal descriptor cache. In response, the graphics driver may use the LUT to return resource content with the real memory address associated with the dummy memory address. When a driver, or an application using the driver, creates a descriptor and stores the resource content in external memory, the descriptor stored in system memory may not be tracked and updated. Instead, a hardware mapper may update the descriptor stored in the hardware internal cache using the LUT when responding to a command to load a descriptor from system memory into the descriptor cache.

In some aspects, to update the LUT with the obtained real memory address in the table entry associated with the dummy memory address, the graphics processor may update the LUT with the obtained real memory address after writing the dummy memory address to the LUT. For example, the graphics processor may first store the dummy memory address to the source field of the table entry associated with the resource descriptor, and then may store at least a portion of the obtained real memory address to the destination field of the table entry associated with the resource descriptor. In some aspects, the graphics processor may store a portion of the obtained real memory address in the destination field of the table entry associated with the resource descriptor, and a second portion of the obtained real memory address in a portion of the source field of the table entry associated with the resource descriptor without overwriting the portion of the source field associated with the dummy memory address.

In some aspects, the graphics processor may obtain an indication of the dummy memory address. For example, a fetch command may retrieve the dummy memory address from the descriptor stored in the hardware internal cache. The graphics processor may determine the real memory address based on the table entry of the LUT associated with the dummy memory address in response to the obtained indication. For example, the graphics processor may search the source fields of the LUT for the obtained dummy memory address, and may then determine the real memory address from the data associated with that table entry. The graphics processor may retrieve resource descriptor data based on the determined real memory address. In other words, the graphics processor may retrieve resource descriptor data associated with the object (e.g., the texel data of a texture) from an external memory by referencing the real memory address retrieved using the obtained dummy memory address. In some aspects, to determine the real memory address based on the table entry of the LUT associated with the dummy memory address, the graphics processor may reconstruct the real memory address based on a source field of the table entry and a destination field of the table entry. For example, the real memory address may be 49 bits long, but the destination field may be 32 bits long. The graphics processor may write the upper 32 bits (e.g., [48:16]) of the real memory address to the source field, and the lower bits (e.g., [15:0]) of the real memory address to the destination field. The graphics processor may then concatenate a portion of the bits in the source field that are associated with the real memory address with the portion of the bits in the destination field that are associated with the real memory address. The lower bits of the source field (e.g., [15:0] may include the dummy memory address, which may be used to uniquely identify the table entry associated with the resource descriptor. In some aspects, the graphics processor may determine that a set of most significant bits (MSBs) of the source field of the table entry are not all set. In such aspects, to reconstruct the real memory address based on the source field of the table entry and the destination field of the table entry, the graphics processor may reconstruct the real memory address based on the source field of the table entry and the destination field of the table entry in response to the determination that the set of MSBs (e.g., [48:16]) of the source field of the table entry are not uniform, or are all set. In other words, the graphics processor may concatenate the portion of the bits in the source field that are associated with the real memory address with the portion of the bits in the destination field that are associated with the real memory address in response to determining that the set of MSBs of the source field of the table entry are not uniform, or are not all set.

In some aspects, the graphics processor may output the dummy memory address for storage in a second memory before the obtainment of the indication of the dummy address. The graphics processor may output the dummy memory address to a driver to store the dummy memory address in an external memory, such as system memory. The driver may then store the dummy memory address in a descriptor in the external memory. The graphics processor may fetch the resource descriptor from the external memory, decode its content to obtain the dummy resource address, then fetch the resource, also referred to as resource content, from the real memory address associated with the dummy resource address (e.g., external memory, on-chip GMEM). The graphics processor may refer to the memory location of the descriptor themselves (e.g., hardware cache) by a set of registers. A graphics driver may manage and store the descriptor in external memory.

In some aspects, to store the dummy memory address in the LUT, the graphics processor may store the dummy memory address in a set of least significant bits (LSBs) of a source field of the table entry and ensure that a set of most significant bits (MSBs) of the source field of the table entry are uniform (e.g., are all 0's or are all 1's). The set of LSBs may not overlap with the set of MSBs. In other words, when storing the dummy memory address, the graphics processor may store the dummy memory address in a fixed number of LSBs of the source field, and may then zero out all remaining bits, or may set all remaining bits to 1. In some aspects, to update the LUT with the obtained real memory address in the table entry associated with the dummy memory address, the graphics processor may update the set of MSBs of the source field of the table entry with a first portion of the obtained real memory address (e.g., [48:16]), and may update a destination field of the table entry with a second portion of the obtained real memory address (e.g., [15:0]).

In some aspects, the graphics processor may output an indication of the updated LUT with the obtained real memory address. For example, the graphics processor may output a unique identifier of the resource descriptor associated with the updated table entry to indicate that the table entry associated with the resource descriptor has been updated. In some aspects, to output the indication of the updated LUT with the obtained real memory address, the graphics processor may transmit the indication of the updated LUT with the obtained real memory address or store the indication of the updated LUT with the obtained real memory address.

In some aspects, to update the LUT with the obtained real memory address in the table entry associated with the dummy memory address, the graphics processor may update the LUT with a set of indicators related to the resource descriptor. The set of indicators may include at least one of an indicator of an object type (e.g., 2D descriptor vs. 3D descriptor) or an indicator of an object size (e.g., number of bytes allocated to the resource content in memory).

In some aspects, the graphics processor may update a resource content based on the obtained real memory address in response to a determination that the resource descriptor is loaded into a hardware. In other words, the graphics processor may update the resource content used by the graphics processor hardware when the descriptor is loaded into the hardware. Since the LUT is on the loading path of the descriptor, the actual resource content may pass through when accessing the allocated memory using the dummy memory address via the LUT. The graphics processor may update a subset of the fields associated with the dummy memory address in the LUT. In some aspects, the graphics processor may process a resource associated with the resource descriptor. For example, the graphics processor may render an object associated with the resource descriptor. The graphics processor may store the processed resource based in a memory based on the obtained real memory address. To update the LUT with the obtained real memory address in the table entry associated with the dummy memory address, the graphics processor may update the LUT with the obtained real memory address in the table entry associated with the dummy memory address in response to processing the resource associated with the resource descriptor. In other words, processing the resource (e.g., rendering an object), may trigger an update of the LUT with the obtained real memory address. The graphics processor loading the resource content may store the entirety of the resource content in the hardware internal buffer or cache, which may be different from the descriptor in system memory. For example, the resource content in the internal cache may have a dummy memory address whereas the resource content in the system memory may have a real memory address.

In some aspects, the graphics processor may generate a second resource descriptor having a second dummy memory address associated with a second object of the second resource descriptor. The graphics processor may store the second dummy memory address the LUT. The graphics processor may refrain from updating a second table entry of the LUT associated with the second dummy memory address. For example, if the graphics processor never loads the resource descriptor into the hardware, the graphics processor may never use the table entry of the LUT associated with the resource descriptor. In an aspect where the resource content is stored in on-chip memory, a graphics driver may not allocate any external memory space for the descriptor. The graphics processor may store the on-chip memory address in the table entry associated with the dummy memory address. When the descriptor is loaded through the LUT into the hardware of the graphics processor, the graphics processor may update the descriptor's memory address field to the on-chip memory address.

In some aspects, a graphics processing system may use a hardware (HW) remapping block to perform a resource descriptor update. A graphics driver may be configured to provide a dummy virtual address in the HW descriptor with lazy memory allocation. The dummy address and the real system address may be mapped as source and destination in remapping blocks, or table entries of a LUT. When the HW loads a resource descriptor, the resource descriptor address may be used to look up the remapping in the LUT. If there is a hit, then the dummy address may be overloaded to the real system address. If there is not a hit, the resource descriptor may be unchanged. This minimizes driver tracking and patching overhead.

Particular aspects of the subject matter described in this disclosure can be implemented to realize one or more of the following potential advantages. In some examples, by writing a dummy memory address to a LUT and remapping the dummy base address later, the described techniques can be used to retain tracking the address of a resource descriptor without incurring overhead costs to track the resource descriptor for patching.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors. A set of processors configured to perform a set of tasks may be configured to perform the set of tasks individually, or in any combination.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a hardware mapper 198 configured to generate a resource descriptor having a dummy memory address associated with an object of the resource descriptor. The hardware mapper 198 may be configured to write the dummy memory address to a LUT. The hardware mapper 198 may be configured to obtain a real memory address associated with the object of the resource descriptor. The hardware mapper 198 may be configured to update the LUT with the obtained real memory address in a table entry associated with the dummy memory address. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
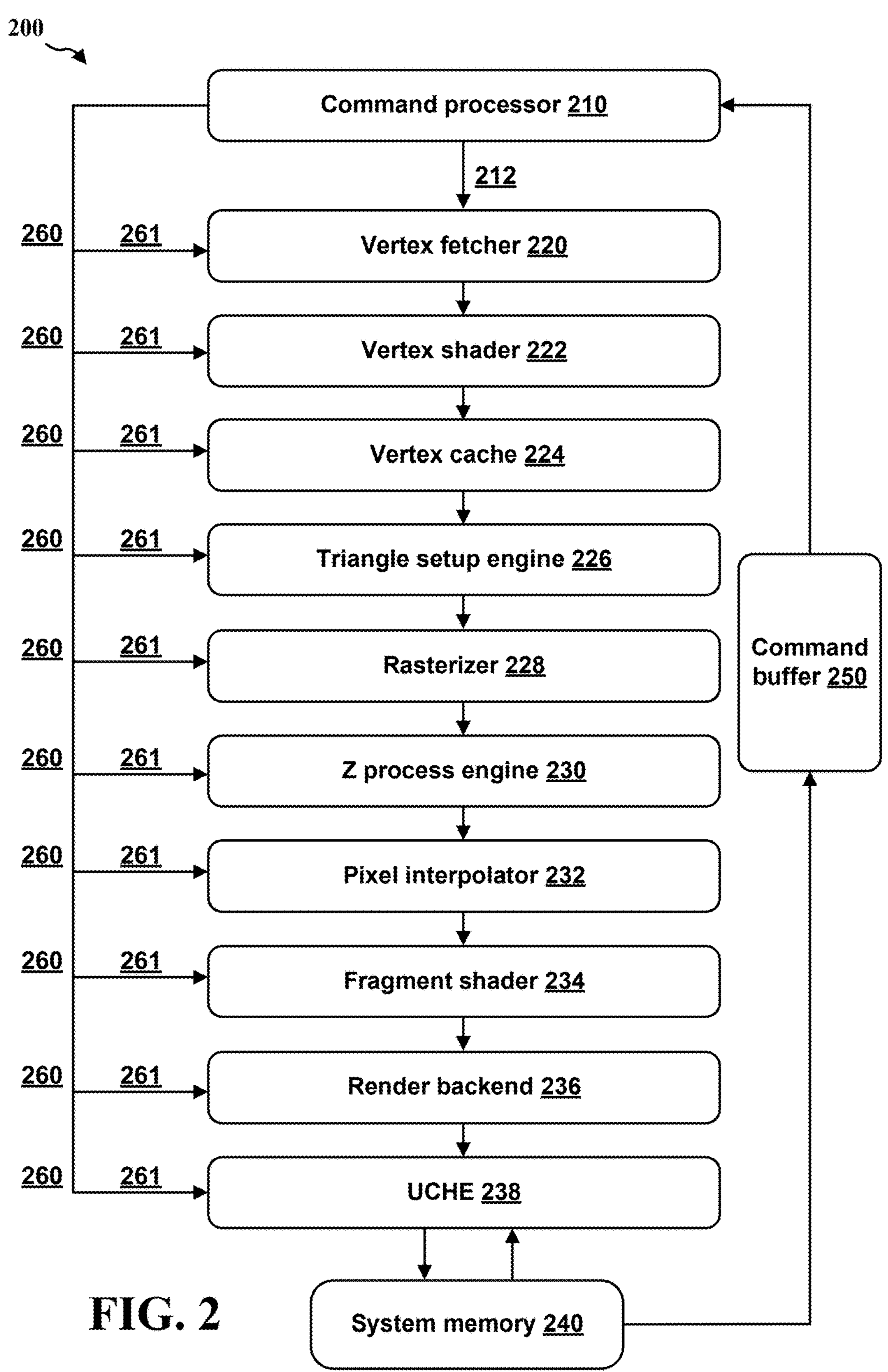
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212.

The CP 210 can then send the context register packets 260 or draw call data packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin. Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
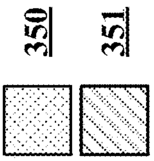
FIG. 3 illustrates an example image or surface in accordance with one or more techniques of this disclosure.
Figure 3:
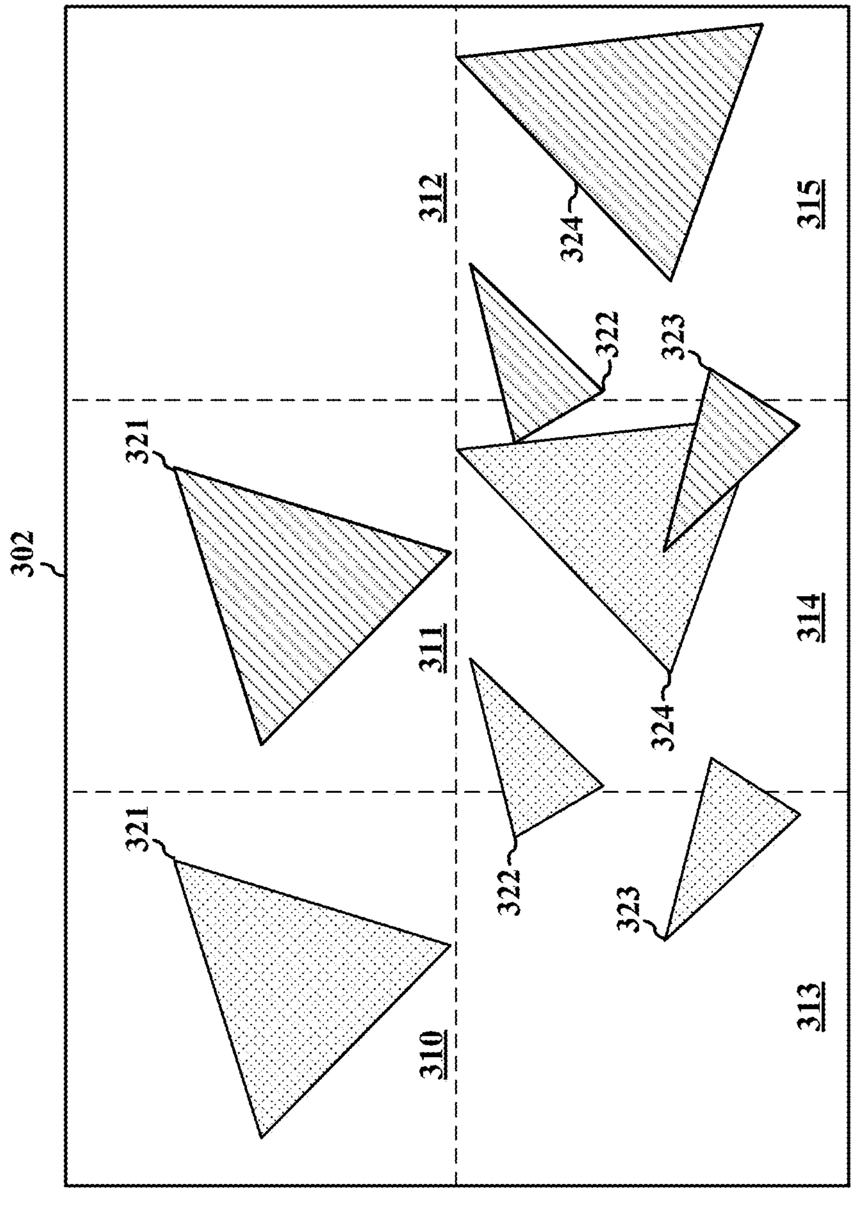
Figure 3:

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Figure 4:
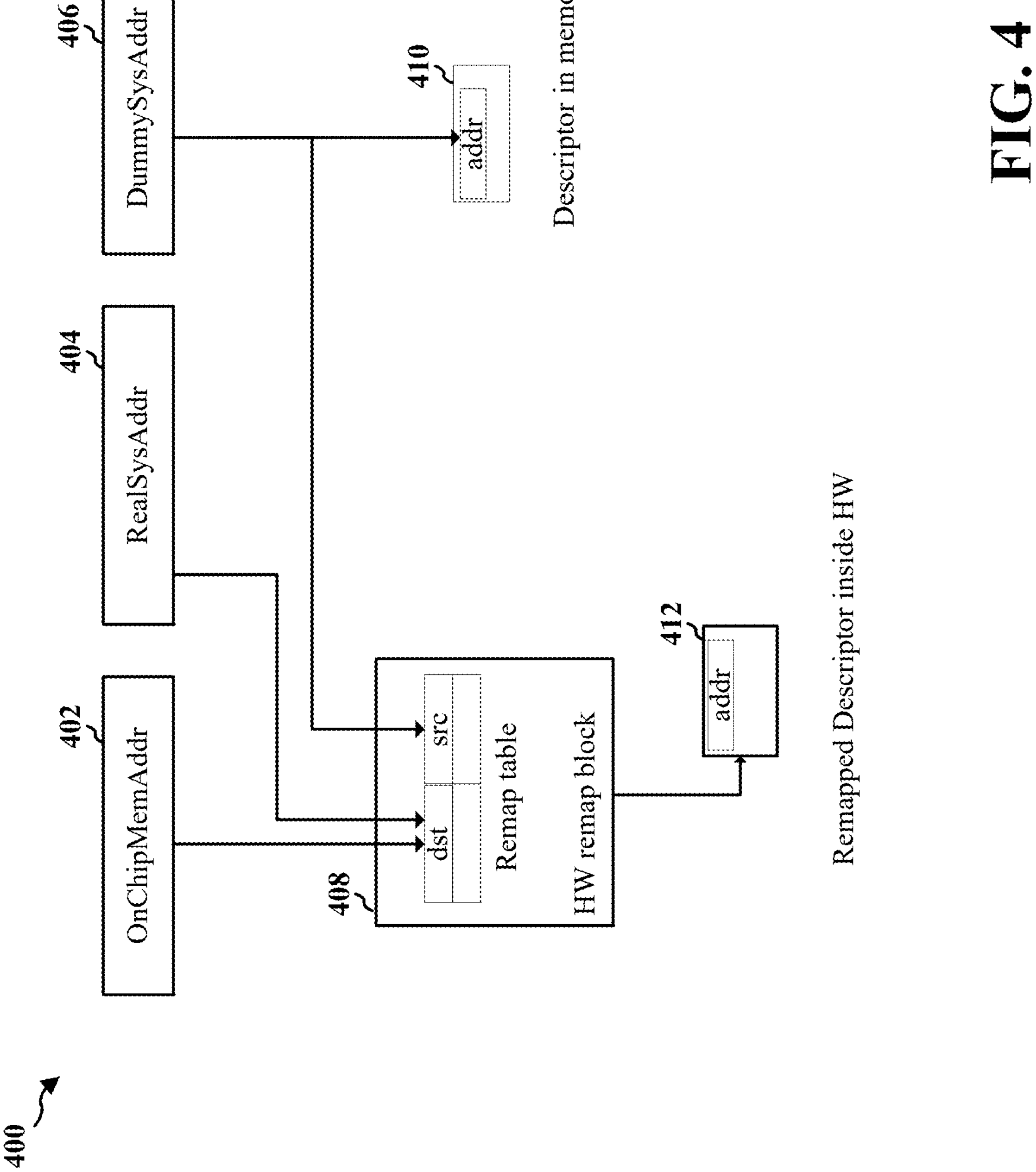
FIG. 4 illustrates an example memory mapping system for descriptors in a graphics processing system, in accordance with one or more techniques of this disclosure.

FIG. 4 is a diagram 400 of an exemplary memory mapping system with a remapping table 408 that is used to track the memory address of an object of a resource descriptor. The object of the resource descriptor may be saved to an on chip memory location, such as GMEM or a local cache, or an off chip memory location, for example real system memory, or a hard disk drive.

A high level sequencer (HLSQ) may generate an IDU descriptor for an object, such as a vertex or a primitive. The HLSQ may not allocate any memory to the object associated with the descriptor 410. When the HLSQ generates the descriptor 410, the HLSQ may assign a dummy system address 406 to the descriptor 410, and may write that dummy system address 406 to the source field of the table entry associated with the descriptor 410 in the remapping table 408. As the graphics processor processes the descriptor 410, the graphics processor may allocate the object to a memory address, for example an on-chip memory address 402 at an on-chip location or a real system memory address 404 at an off-chip location. The graphics processor may then store the memory address to the destination field of the remapping table 408. When the system wishes to access the memory address via the descriptor 410 in memory or the remapped descriptor 412 in the HW, the system may use the dummy system address 406 to reference the memory address written to the dummy system address 406.

In some aspects, a hardware mapper may be configured to use the source field of the remapping table 408 as the resource address field stored in the descriptor. The source field may also be referred to as the table lookup key, which may be a unique value that identifies the descriptor, and therefore the resource associated with the descriptor. In addition to the source field and the destination field, the remapping table 408 may have additional fields, for example a resource size field, a dimension field, and/or a layout field. Such additional fields may be associated with the memory location where the resource is stored. For example, the resource size, dimension, and/or layout of a resource may be different depending upon whether the resource is stored in an on-chip memory (e.g., via the on-chip memory address 402) or on an off-chip memory, or external memory (e.g., via the real system memory address 404).

In some aspects, an application may first generate a set of descriptors, each of which may be associated with a dummy system address which is stored in the remapping table. The application may render draws, and select a subset of the set of descriptors to use. The driver may then allocate memory in the GMEM for the resources that are associated with the subset of the set of descriptors, assigning each resource associated with the corresponding descriptor of the subset a memory size and memory address. The driver may then use the hardware registers in the remapping table to store the associated assigned GMEM memory address to the table entries that are associated with corresponding descriptors of the subset of the set of descriptors. In this manner, the remapping table can inform each draw of the corresponding GMEM memory address for descriptors that are actually allocated by using a low overhead. For example, when a shader accesses resources based on a set of shader instructions, the driver may fetch the descriptor having the dummy memory address, and then utilize the remapping table to obtain the corresponding address of a resource associated with a descriptor in an address field associated with the dummy address of the descriptor, which may be used to fetch the content of the resource from the GMEM memory address accordingly.

Figure 5:
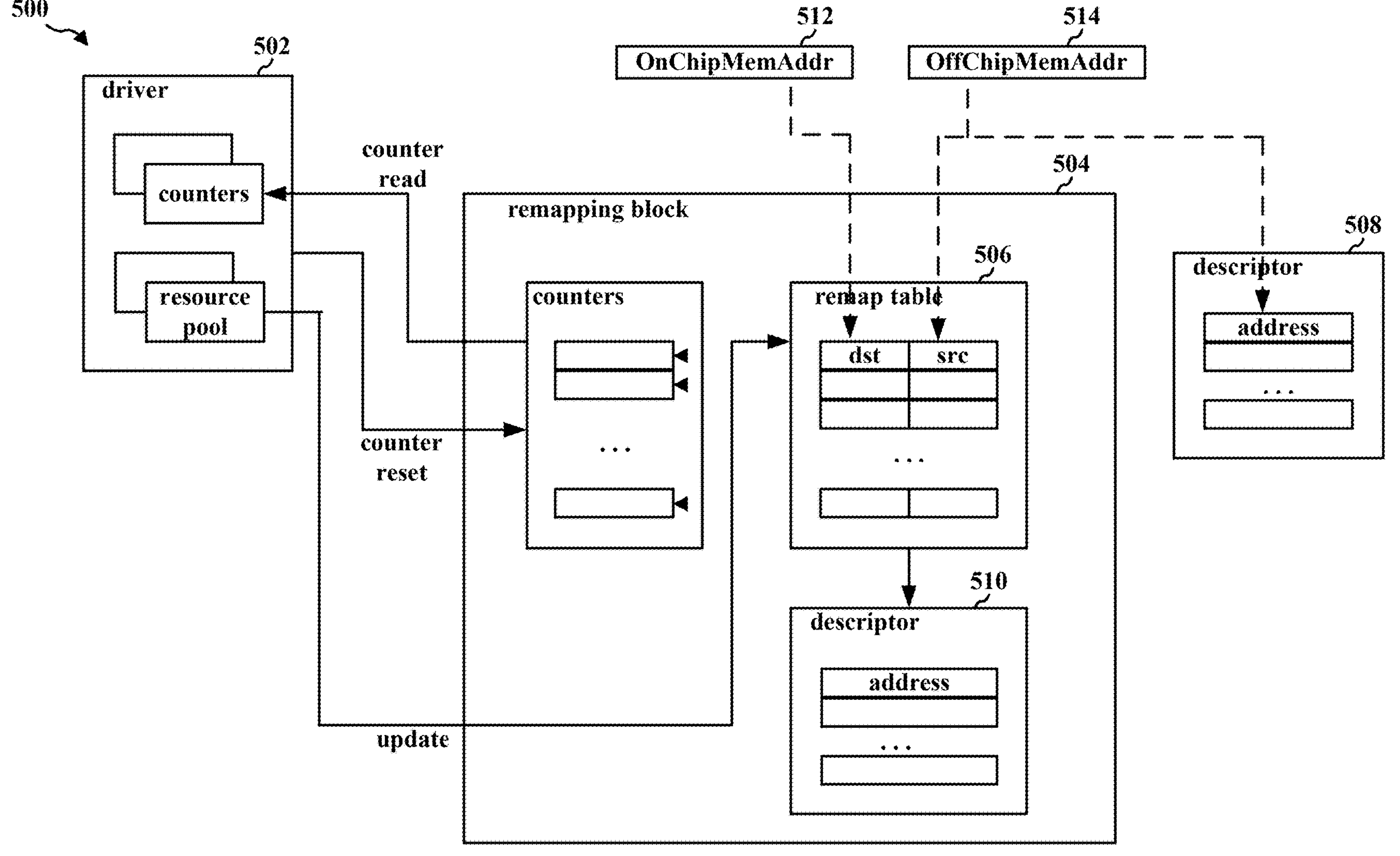
FIG. 5 illustrates an example memory mapping system for descriptors in a graphics processing system, in accordance with one or more techniques of this disclosure.

FIG. 5 is a diagram 500 of an exemplary memory mapping system with a remapping table 506 that may be used by the remapping block 504 to track the memory address of an object of a resource descriptor. The remapping block 504 may also be referred to as a hardware remapping block or a hardware block. The remapping block 504 may be an engine of a graphics processor, such as a GPU. A driver 502 may be configured to generate the resource descriptor 508, and save it in a system memory, which also may be referred to as a real memory. When the driver 502 generates the resource descriptor 508, the driver 502 may defer memory allocation to later, and the address saved in the resource descriptor 508 may have a default value, such as a NULL value. For example, an application may be configured to generate a plurality of frames, where each frame has a plurality of draw calls to render a plurality of surfaces, respectively. The driver 502 may generate a resource descriptor for each of the plurality of surfaces, and may defer memory allocation to later. At each draw call or surface rendering, the driver 502 may then determine how many surfaces will be rendered for the current command buffer, and may determine how many of the resource objects will be saved in an on-chip memory, for example GMEM, and how many of the resource objects will be saved in an off-chip memory, such as system memory or external memory. A remapping block 504 may handle remapping of an address saved in the resource descriptor 508 saved in the off-chip memory, or external memory.

If the driver 502 determines that the resource object will be stored in an off-chip memory, the driver 502 may allocate the off-chip memory, and update the resource descriptor 508 with the off-chip memory address 514 of the allocated off-chip memory. When the driver 502 references the resource object using the off-chip memory address 514 of the allocated off-chip memory stored in the resource descriptor 508, the remapping block 504 may perform a table lookup of the given memory address in the remapping table 506. If the remapping table 506 does not include the memory address, then the remapping block 504 may reference the off-chip memory address in the resource descriptor 510 used by the remapping block 504. If the driver 502 determines that the resource object will be stored in an on-chip memory, the driver 502 may allocate the on-chip memory, and update the resource descriptor 508 with a virtual address. In some aspects, the driver 502 may generate the resource descriptor 508 with the virtual address, such that the driver 502 never updates the resource descriptor 508 later when the on-chip memory is allocated. The virtual address may also be referred to as a virtual byte address, or an unused off-chip memory address. The virtual address may refer to a real memory address in the off-chip memory, but that real memory address may be unused or may not be allocated to the resource descriptor. The driver 502 may then update the remapping table 506 to provide a mapping between the virtual address and the on-chip memory address 512. The virtual address may be saved in a source field of the remapping table 506, while the on-chip memory address 512 may be saved in a destination field of the remapping table 506. When the driver 502 references the resource object using the virtual address stored in the resource descriptor 508, the remapping block 504 may perform a table lookup of the given memory address in the remapping table 506. If the remapping table 506 includes the memory address, then the remapping block 504 may then retrieve the resource object using the on-chip memory address saved in the destination field that is correlated with the given memory address saved in the source field.

In some aspects, the driver 502 may store the resource object in both an on-chip memory and an off-chip memory. For example, the driver 502 may store part of the resource object in an on-chip memory and part of the resource object in the off-chip memory. In such an embodiment, the driver 502 may allocate the on-chip memory and the off-chip memory, and update the resource descriptor 508 with the off-chip memory address 514. The driver 502 may then update the remapping table 506 to provide a mapping between the off-chip memory address 514 and the on-chip memory address 512. The m off-chip memory address 514 may be saved in a source field of the remapping table 506, while the on-chip memory address 512 may be saved in a destination field of the remapping table 506. When the driver 502 references the resource object using the off-chip memory address 514 stored in the resource descriptor 508, the remapping block 504 may perform a table lookup of the given memory address in the remapping table 506. If the remapping table 506 includes the memory address and a flag indicating that resource object is stored in both the on-chip memory and the off-chip memory, then the remapping block 504 may then retrieve the resource object using the on-chip memory address saved in the destination field that is correlated with the given memory address saved in the source field and the off-chip memory address 514.

In one example, when the descriptor 508 is loaded by the hardware to level 1 (L1) cache, a high level sequencer (HLSQ) may use the address stored in the resource descriptor 508 to look up the virtual address in the remapping table 506. If the address results in a hit, the remapping block 504 may overload the related fields in the resource descriptor 510 used by the remapping block 504. If the address does not result in a hit, then the remapping table 506 may use the address stored in the resource descriptor 508 to load the fields in the resource descriptor 510 used by the remapping block 504.

In some aspects, the off-chip memory address 514 may be 49 bits long ([48:0]) while the memory address 512 of the allocated on-chip memory may be 28 bits long ([27:0]). The remapping block 504 may also store various flags in the source field of the remapping table 506, for example a flag to indicate whether the resource object is fully, or partially, saved in the on-chip memory, and/or a flag to indicate which partition of the on-chip memory is used.

While the system illustrated in FIG. 5 may patch the descriptor 508 with an off-chip memory address after the descriptor 508 has been created, this update may involve heavy overhead, as the driver tracks each and every resource descriptor to update after the memory allocation occurs.

Figure 6:
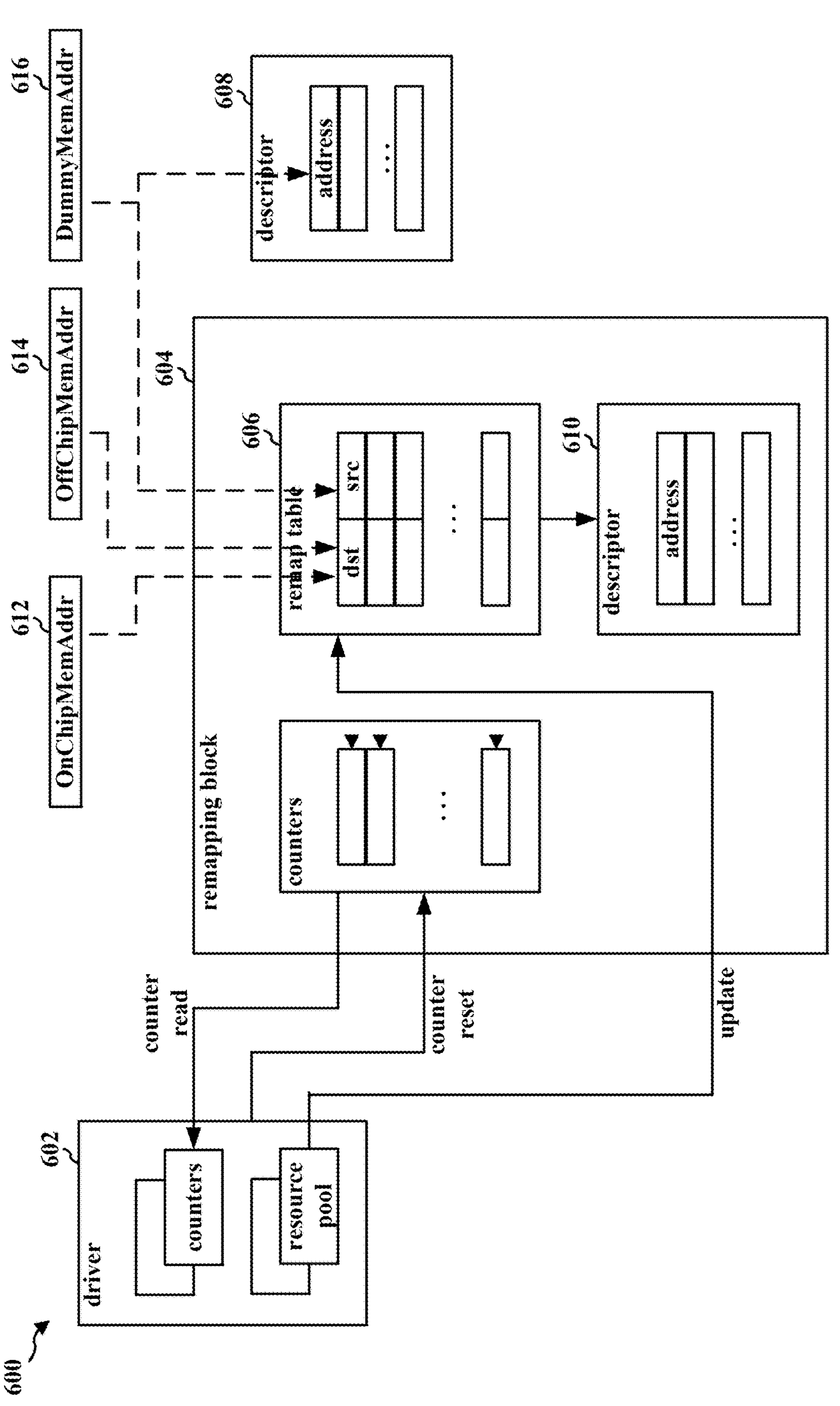
FIG. 6 illustrates an example memory mapping system for descriptors in a graphics processing system, in accordance with one or more techniques of this disclosure.

FIG. 6 is a diagram 600 of an exemplary memory mapping system with a remapping table 606 that may be used by the remapping block 604 to track the memory address of an object of a resource descriptor. The remapping block 604 may also be referred to as a hardware remapping block or a hardware block. The remapping block 604 may be an engine of a graphics processor, such as a GPU. However, the driver 602 may generate the resource descriptor 608 with a dummy memory address 616, and may not track the resource descriptor 608 for an update later, with an updated memory address. In other words, after the driver 602 generates the resource descriptor 608 with the dummy memory address 616, the driver 602 may not update the resource descriptor 608 later when memory is allocated, whether or not the memory is off-chip memory or on-chip memory. The driver 602 may be configured to generate the resource descriptor 608, and save it in a system memory, which also may be referred to as a real memory. When the driver 602 generates the resource descriptor 608, the driver 602 may defer memory allocation to later. For example, an application may be configured to generate a plurality of frames, where each frame has a plurality of draw calls to render a plurality of surfaces, respectively. The driver 602 may generate a resource descriptor for each of the plurality of surfaces, and may defer memory allocation to later. At each draw call or surface rendering, the driver 602 may then determine how many surfaces will be rendered for the current command buffer, and may determine how many of the resource objects will be saved in an on-chip memory, for example GMEM, and how many of the resource objects will be saved in an off-chip memory, such as system memory or external memory. The remapping block 604 may handle remapping of the dummy memory address 616 saved in the resource descriptor 608 to an off-chip memory address and/or an on-chip memory address saved in the resource descriptor 610 of the remapping block 604.

If the driver 602 determines that the resource object will be stored in an off-chip memory, the driver 602 may allocate the off-chip memory, and update the remapping table 606 with the off-chip memory address 614 of the allocated off-chip memory. The driver 602 may update the remapping table 606 to provide a mapping between the dummy memory address 616 saved in the resource descriptor 608 and the off-chip memory address 614. The dummy memory address 616 may be saved in a source field of the remapping table 606, while the off-chip memory address 614 may be saved in a destination field of the remapping table 606. When the driver 602 references the resource object using the dummy memory address 616 stored in the resource descriptor 608, the remapping block 604 may perform a table lookup of the given memory address in the remapping table 606 and store that address to the resource descriptor 610 of the remapping block 604. The remapping block 604 may then retrieve the resource object using the off-chip memory address 614 saved in the destination field that is correlated with the given memory address saved in the source field.

If the driver 602 determines that the resource object will be stored in an on-chip memory, the driver 602 may allocate the on-chip memory, and update the remapping table 606 with the on-chip memory address 612 of the allocated on-chip memory. The driver 602 may update the remapping table 606 to provide a mapping between the dummy memory address 616 and the on-chip memory address 612. The dummy memory address 616 may be saved in a source field of the remapping table 606, while the on-chip memory address 612 may be saved in a destination field of the remapping table 606. When the driver 602 references the resource object using the dummy memory address 616 stored in the resource descriptor 608, the remapping block 604 may perform a table lookup of the given memory address in the remapping table 606 and store that address to the resource descriptor 610 of the remapping block 604. The remapping block 604 may then retrieve the resource object using the on-chip memory address 612 saved in the destination field that is correlated with the given memory address saved in the source field.

In some aspects, the driver 602 may store the resource object in both an on-chip memory and an off-chip memory. For example, the driver 602 may store part of the resource object in an on-chip memory and part of the resource object in the off-chip memory. In such an embodiment, the driver 602 may allocate the on-chip memory and the off-chip memory, and update the remapping table 606 with the off-chip memory address 614 of the allocated off-chip memory and the on-chip memory address 612 of the allocated on-chip memory. The driver 602 may update the remapping table 606 to provide a mapping between the off-chip memory address 614 and the dummy memory address 616, and a mapping between the on-chip memory address 612 and the dummy memory address 616. In some aspects, the dummy memory address 616 may be saved in a source field of the remapping table 606, while the on-chip memory address 612 may be saved in a destination field of the remapping table 606 for one table entry, while the dummy memory address 616 may be saved in a source field of the remapping table 606, while the off-chip memory address 614 may be saved in a destination field of the remapping table 606 for another table entry. In other aspects, the dummy memory address 616, the on-chip memory address 612, and the off-chip memory address 614 may be saved in a single table entry. When the driver 602 references the resource object using the dummy memory address 616 stored in the resource descriptor 608, the remapping block 604 may perform a table lookup of the given memory address in the remapping table 606. If the remapping table 606 includes an indication that resource object is stored in both the on-chip memory and the off-chip memory (e.g., two table entries for the same source address, or a flag that indicates that the resource object is stored in both the on-chip and off-chip memory), then the remapping block 604 may store both addresses in the resource descriptor 610 of the remapping block 604. The remapping block 604 may retrieve the resource object using the on-chip memory address and the off-chip memory address saved in the remapping table 606 that is correlated with the dummy memory address 616.

In some aspects, the off-chip memory address 614 of the allocated off-chip memory may be 49 bits long ([48:0]) while the on-memory address 612 of the allocated on-chip memory may be 28 bits long ([27:0]). The remapping block 604 may also store various flags in the source field of the remapping table 606, for example a flag to indicate whether the resource object is fully, or partially, saved in the on-chip memory, and/or a flag to indicate which partition of the on-chip memory is used.

In some aspects, to account for an embodiment where the driver 602 stores the resource object in both an on-chip memory and an off-chip memory, rather than widen the destination field of the remapping table 606 to add space for a second destination field, the remapping block 604 may be configured to use some of the source bits to use for the destination field. In such aspects, a number (e.g., 16 bits, [15:0]) of the least significant bits (LSBs) of the source field may be used for the dummy memory address, another bit to use as a flag to indicate that a number (e.g., 33 bits, [48:16]) the upper most significant bits (MSBs) of the source field may be used to store some of the off-chip memory address. When the driver 602 outputs the 49 bits ([48:0]) of the off-chip memory address to the remapping block 604, the remapping block 604 may store the upper bits ([48:16]) of the off-chip memory address into the MSBs of the source field while the lower bits ([15:0]) of the source field store the dummy memory address, and may store the lower bits ([15:0]) of the off-chip memory address into bits the destination field.

Figure 7:
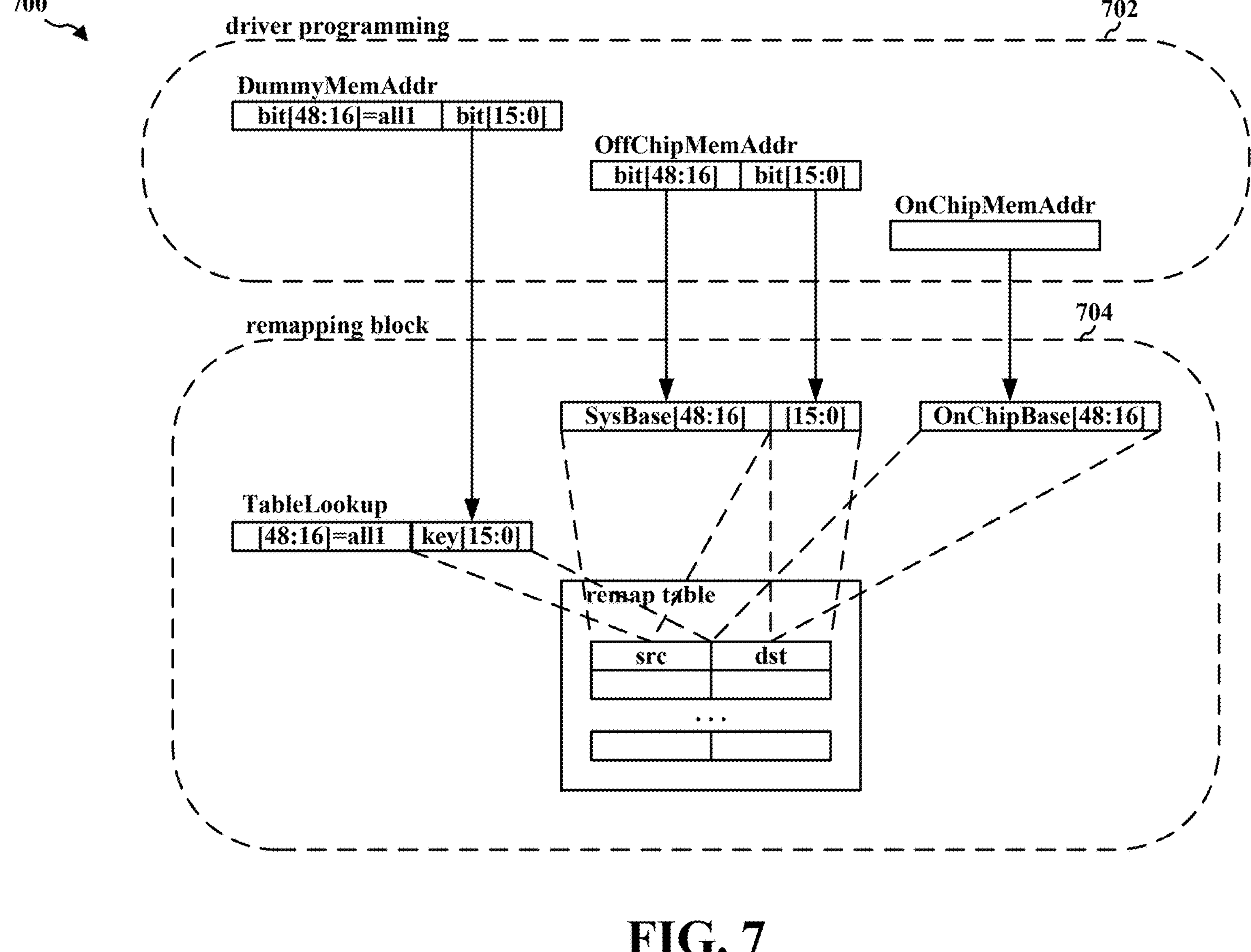
FIG. 7 illustrates an example of different ways that an address entry may be formatted, in accordance with one or more techniques of this disclosure.

FIG. 7 is a diagram 700 of a remapping block 704 configured to map portions of a dummy memory address, an off-chip memory address, and an on-chip memory address from a driver 702 to a remapping table of the remapping block 704.

The dummy memory address may be 49 bits long. The 16 LSBs ([15:0]) of the dummy memory address may correlate with the dummy memory address while the 33 MSBs ([48:16]) of the dummy memory address may be set to 1's or 0's. This provides 65,536 possible dummy memory addresses to the driver 702. The 16 LSBs ([15:0]) of the dummy memory address may be stored in the LSBs of the source field of the remapping table.

The off-chip memory address, also referred to as the real system memory address, real memory address, or external memory address, may also be 49 bits long. The 16 LSBs ([15:0]) of the off-chip memory address may be stored in the LSBs of the destination field of the remapping table, while the 33 MSBs ([48:16]) of the off-chip memory address may be stored in the MSBs of the source field of the remapping table. As a result, if the remapping block 704 determines that the MSBs of the source field are not all the same (e.g., all 1's or all 0's), then the remapping block 704 may determine that the MSBs of the source field correlate with the MSBs of an off-chip memory address.

The on-chip memory address, also referred to as a graphics memory or GMEM, may be 33 bits long or less. The 33 bits of the on-chip memory address may be stored in the MSBs ([48:16]) of the destination field of the remapping table. In this manner, a single entry of the remapping table may correlate a dummy memory address to both an off-chip memory address and an on-chip memory address. In some aspects, a portion of the destination field may be used to indicate flags. For example, where the on-chip memory address is 30 bits long, the 30 bits ma be stored in bits [48:19], bit 18 may be a flag used to refer to which partition of the GMEM is used, bit 17 may be a flag used to indicate whether the resource object is stored on the off-chip memory and not the on-chip memory, or is stored on both the off-chip memory and the on-chip memory, and bit 16 may be a flag used to indicate whether the remapping table entry maps to a dummy memory address.

Figure 8:
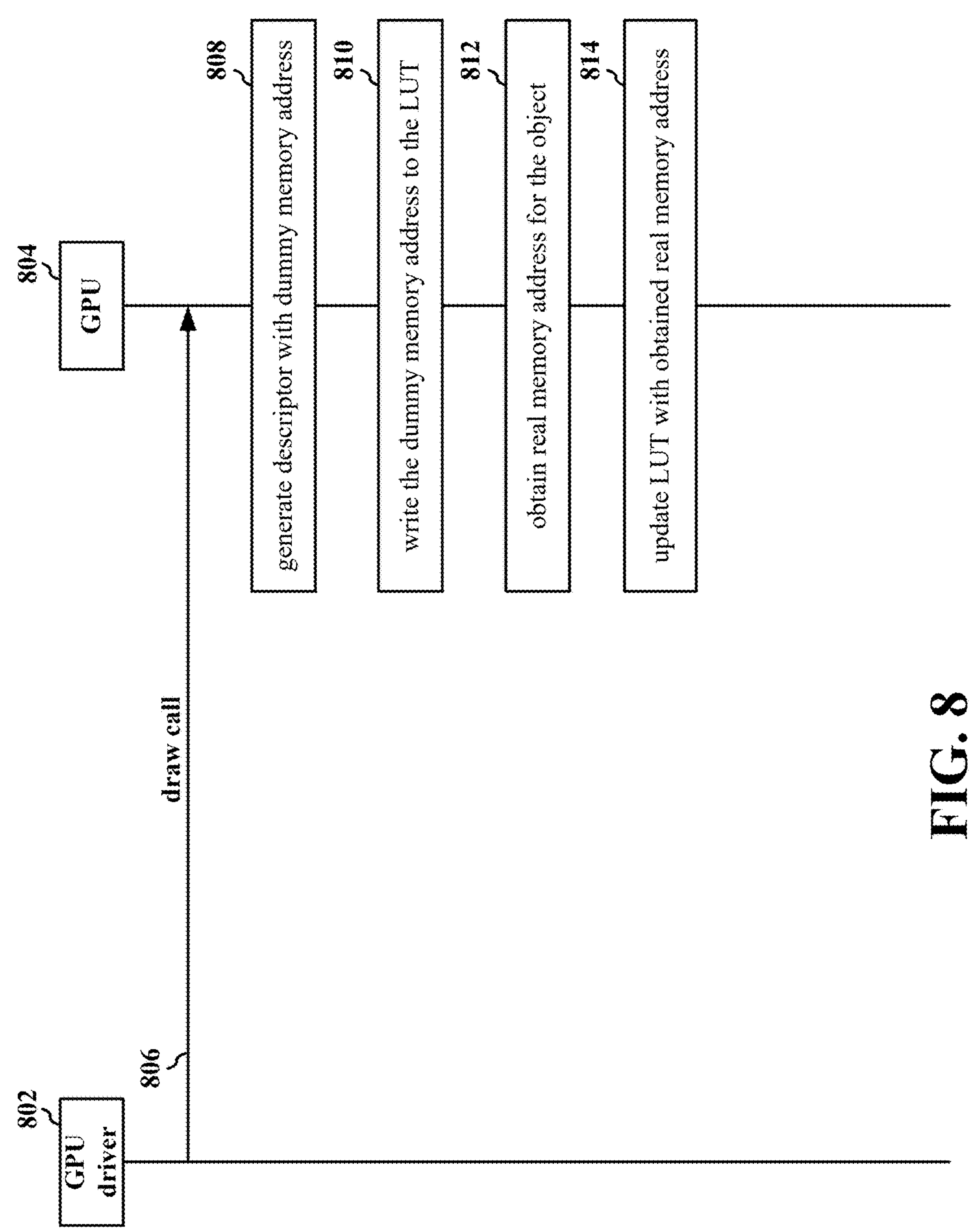
FIG. 8 is a call flow diagram illustrating example communications between a driver and a GPU, in accordance with one or more techniques of this disclosure.

FIG. 8 is a call flow diagram 800 illustrating example communications between a GPU driver 802 and a GPU 804 in accordance with one or more techniques of this disclosure.

The GPU driver 802 may output an indication 806 of a draw call. The draw call may render a set of objects, for example a set of vertices or a set of primitives for a frame. At 808, the GPU 804 may generate a resource descriptor with a dummy memory address. At 810, the GPU 804 may write the dummy memory address to the LUT. At 812, the GPU 804 may obtain a real memory address for the object. For example, the GPU 804 may render the object, and determine that the object should be written to a real memory of the system. At 814, the GPU 804 may update the LUT with the real memory address obtained at 812.

Figure 9:
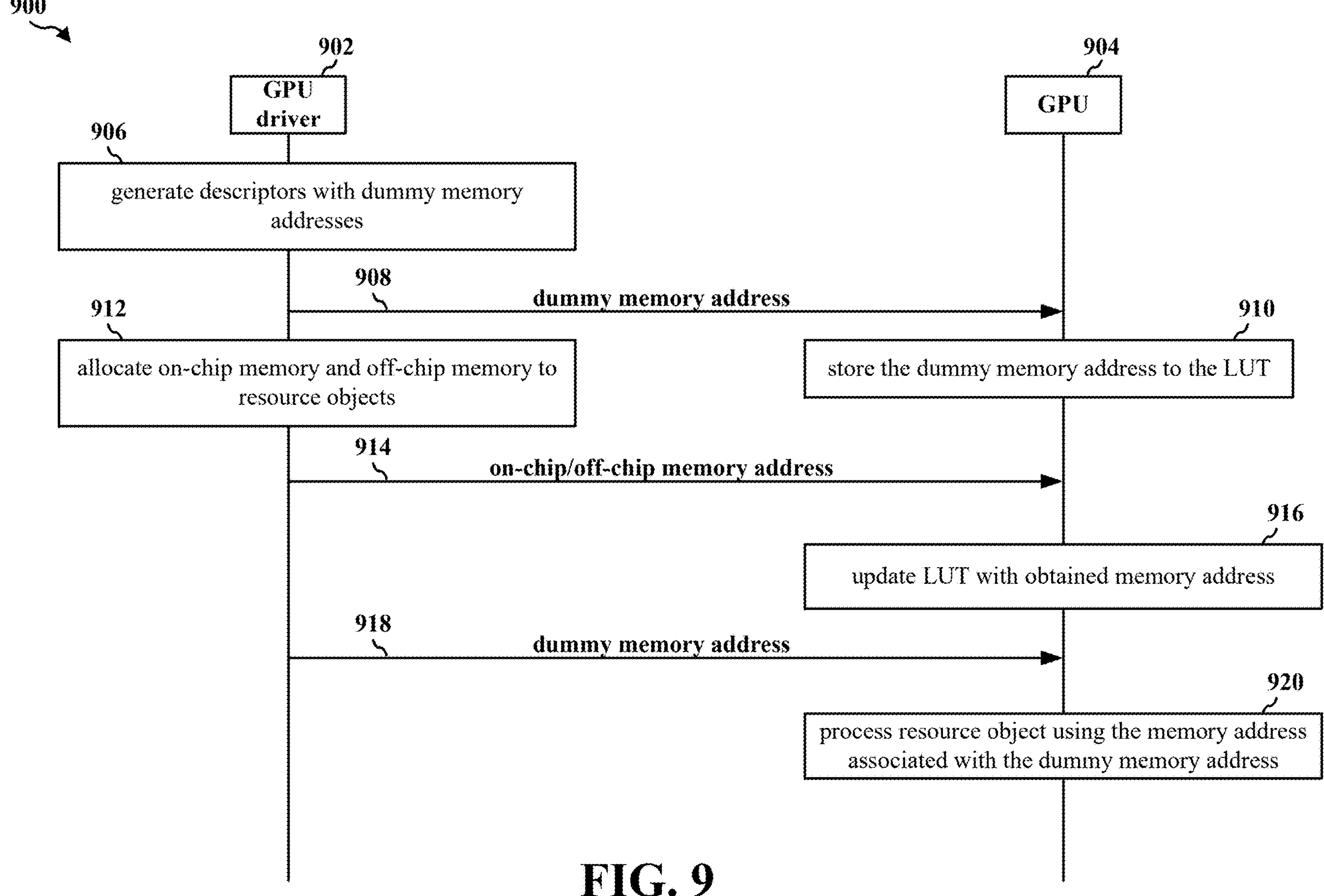
FIG. 9 is a call flow diagram illustrating example communications between a driver and a GPU, in accordance with one or more techniques of this disclosure.

FIG. 9 is a call flow diagram 900 illustrating example communications between a GPU driver 902 and a GPU 904 in accordance with one or more techniques of this disclosure.

At 906, the GPU driver 902 may generate a set of resource descriptors, each with an associated dummy memory address. The GPU driver 902 may output an indicator 908 of the dummy memory addresses to the GPU 904. At 910, the GPU 904 may store the dummy memory addresses in the LUT, such as a remapping table. At 912, the GPU driver 902 may allocate which portions of the on-chip memory to allocate to some of the resource descriptors, and which portions of the off-chip memory to allocate to some others of the resource descriptors. The GPU driver 902 may output an indication 914 of the on-chip memory addresses and/or off-chip memory addresses to the GPU 904. At 916, the GPU 904 may update the LUT with the on-chip memory addresses and/or the off-chip memory addresses associated with the dummy memory addresses. Later, the GPU driver 902 may output an indication 918 to process a resource based on a dummy memory address of a resource descriptor to the GPU 904. At 920, the GPU 904 may process the resource object using the memory address associated with the dummy memory address. In other words, the GPU 904 may access the resource object by retrieving either an on-chip memory address, an off-chip memory address, or both an on-chip memory address and an off-chip memory address associated with the dummy memory address based on one or more entries in the LUT.

FIG. 10 is a flowchart 1000 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-5.

At 1002, the apparatus may generate a resource descriptor having a dummy memory address associated with an object of the resource descriptor. For example, referring to FIG. 8, the GPU 804 may, at 808, generate a resource descriptor having a dummy memory address associated with an object of the resource descriptor. Moreover, 1002 may be performed by the hardware mapper 198 in FIG. 1.

At 1004, the apparatus may write the dummy memory address to a LUT. For example, referring to FIG. 8, the GPU 804 may, at 810, write the dummy memory address to a LUT. Moreover, 1004 may be performed by the hardware mapper 198 in FIG. 1.

At 1006, the apparatus may obtain a real memory address associated with the object of the resource descriptor. For example, referring to FIG. 8, the GPU 804 may, at 812, obtain a real memory address associated with the object of the resource descriptor. Moreover, 1006 may be performed by the hardware mapper 198 in FIG. 1.

At 1008, the apparatus may update the LUT with the obtained real memory address in a table entry associated with the dummy memory address. For example, referring to FIG. 8, the GPU 804 may, at 814, update the LUT with the obtained real memory address in a table entry associated with the dummy memory address. Moreover, 1008 may be performed by the hardware mapper 198 in FIG. 1.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for generating a resource descriptor having a dummy memory address associated with an object of the resource descriptor. The apparatus may further include means for writing the dummy memory address to a LUT. The apparatus may further include means for obtaining a real memory address associated with the object of the resource descriptor. The apparatus may further include means for updating the LUT with the obtained real memory address in a table entry associated with the dummy memory address.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

An indication of a set of data may include the data itself, or a reference to the data, for example a memory address where the data may be retrieved by the receiving entity, or an index to a set of data (e.g., an index of 1 that represents the series of bits 1100101). A single indication may also include a set of indications, for example an array of memory addresses or a plurality of index references.

The following aspects are illustrative only and may be combined with other aspects or teachings described herein, without limitation.

Aspect 1 is a method of graphics processing, comprising: generating a resource descriptor having a dummy memory address associated with a resource object; storing the dummy memory address in a look-up table (LUT); obtaining a real memory address associated with the resource object; and updating the LUT with the obtained real memory address in a table entry associated with the dummy memory address.

Aspect 2 is the method of aspect 1, wherein updating the LUT with the obtained real memory address in the table entry associated with the dummy memory address comprises: updating the LUT with the obtained real memory address after storing the dummy memory address to the LUT.

Aspect 3 is the method of either of aspects 1 or 2, further comprising: obtaining an indication of the dummy memory address; determining the real memory address based on the table entry of the LUT associated with the dummy memory address in response to the obtained indication; and retrieving resource data associated with the resource descriptor based on the determined real memory address.

Aspect 4 is the method of aspect 3, wherein determining the real memory address based on the table entry of the LUT associated with the dummy memory address comprises: reconstructing the real memory address based on a source field of the table entry and a destination field of the table entry.

Aspect 5 is the method of aspect 4, further comprising: determining that a set of most significant bits (MSBs) of the source field of the table entry are not all set, wherein reconstructing the real memory address based on the source field of the table entry and the destination field of the table entry comprises: reconstructing the real memory address based on the source field of the table entry and the destination field of the table entry in response to the determination that the set of MSBs of the source field of the table entry are not all set.

Aspect 6 is the method of any of aspects 3 to 5, further comprising: outputting the dummy memory address for storage in a second memory before the obtainment of the indication of the dummy address.

Aspect 7 is the method of any of aspects 1 to 6, wherein storing the dummy memory address to the LUT comprises: storing the dummy memory address in a set of least significant bits (LSBs) of a source field of the table entry; and setting a set of most significant bits (MSBs) of the source field of the table entry, wherein the set of LSBs do not overlap with the set of MSBs.

Aspect 8 is the method of aspect 7, wherein updating the LUT with the obtained real memory address in the table entry associated with the dummy memory address comprises: updating the set of MSBs of the source field of the table entry with a first portion of the obtained real memory address; and updating a destination field of the table entry with a second portion of the obtained real memory address.

Aspect 9 is the method of any of aspects 1 to 8, further comprising: outputting an indication of the updated LUT with the obtained real memory address.

Aspect 10 is the method of aspect 9, wherein outputting the indication of the updated LUT with the obtained real memory address comprises: transmitting the indication of the updated LUT with the obtained real memory address; or storing the indication of the updated LUT with the obtained real memory address.

Aspect 11 is the method of any of aspects 1 to 10, wherein updating the LUT with the obtained real memory address in the table entry associated with the dummy memory address comprises: updating the LUT with a set of indicators related to the resource descriptor, wherein the set of indicators comprise at least one of: an indicator of an object type; or an indicator of an object size.

Aspect 12 is the method of any of aspect 1 to 11, further comprising: updating a resource content based on the obtained real memory address in response to a determination that the resource descriptor is loaded into a hardware.

Aspect 13 is the method of any of aspects 1 to 12, further comprising: processing a resource associated with the resource descriptor; storing the processed resource based on the obtained real memory address, wherein updating the LUT with the obtained real memory address in the table entry associated with the dummy memory address comprises: updating the LUT with the obtained real memory address in the table entry associated with the dummy memory address in response to processing the resource associated with the resource descriptor.

Aspect 14 is the method of any of aspects 1 to 13, further comprising: generating a second resource descriptor having a second dummy memory address associated with a second object of the second resource descriptor; storing the second dummy memory address the LUT; and refraining from updating a second table entry of the LUT associated with the second dummy memory address.

Aspect 15 is an apparatus for graphics processing including at least one processor coupled to a memory and configured to implement a method as in any of aspects 1-14.

Aspect 16 may be combined with aspect 15 and includes that the apparatus is a wireless communication device.

Aspect 17 is an apparatus for graphics processing including means for implementing a method as in any of aspects 1-14.

Aspect 18 is a computer-readable medium (e.g., a non-transitory computer-readable medium) storing computer executable code, the code when executed by at least one processor causes the at least one processor to implement a method as in any of aspects 1-14.

Various aspects have been described herein. These and other aspects are within the scope of the following claims.

What is claimed is:

1. An apparatus for graphics processing, comprising:

a memory; and a processor coupled to the memory and, based at least in part on information stored in the memory, the processor is configured to:

generate a resource descriptor having a dummy memory address associated with a resource object;

store the dummy memory address in a look-up table (LUT);

obtain a real memory address associated with the resource object; and update the LUT with the obtained real memory address in a table entry associated with the dummy memory address.

2. The apparatus of claim 1, wherein, to update the LUT with the obtained real memory address in the table entry associated with the dummy memory address, the processor is configured to:

update the LUT with the obtained real memory address after a storage of the dummy memory address in the LUT.

3. The apparatus of claim 1, wherein the processor is further configured to:

obtain an indication of the dummy memory address;

determine the real memory address based on the table entry of the LUT associated with the dummy memory address in response to the obtained indication; and retrieve resource data associated with the resource descriptor based on the determined real memory address.

4. The apparatus of claim 3, wherein, to determine the real memory address based on the table entry of the LUT associated with the dummy memory address, the processor is configured to:

reconstruct the real memory address based on a source field of the table entry and a destination field of the table entry.

5. The apparatus of claim 4, wherein the processor is further configured to:

determine that a set of most significant bits (MSBs) of the source field of the table entry are not all set, wherein, to reconstruct the real memory address based on the source field of the table entry and the destination field of the table entry, the processor is configured to:

reconstruct the real memory address based on the source field of the table entry and the destination field of the table entry in response to the determination that the set of MSBs of the source field of the table entry are not all set.

6. The apparatus of claim 3, wherein the processor is further configured to:

output the dummy memory address for storage in a second memory before the obtainment of the indication of the dummy address.

7. The apparatus of claim 1, wherein, to store the dummy memory address in the LUT, the processor is configured to:

store the dummy memory address in a set of least significant bits (LSBs) of a source field of the table entry; and set a set of most significant bits (MSBs) of the source field of the table entry, wherein the set of LSBs do not overlap with the set of MSBs.

8. The apparatus of claim 7, wherein, to update the LUT with the obtained real memory address in the table entry associated with the dummy memory address, the processor is configured to:

update the set of MSBs of the source field of the table entry with a first portion of the obtained real memory address; and update a destination field of the table entry with a second portion of the obtained real memory address.

9. The apparatus of claim 1, wherein the processor is further configured to:

output an indication of the updated LUT with the obtained real memory address.

10. The apparatus of claim 9, wherein to output the indication of the updated LUT with the obtained real memory address, the processor is configured to:

transmit the indication of the updated LUT with the obtained real memory address; or store the indication of the updated LUT with the obtained real memory address.

11. The apparatus of claim 1, wherein, to update the LUT with the obtained real memory address in the table entry associated with the dummy memory address, the processor is configured to:

update the LUT with a set of indicators related to the resource descriptor, wherein the set of indicators comprise at least one of:

an indicator of an object type; or an indicator of an object size.

12. The apparatus of claim 1, wherein the processor is further configured to:

update a resource content based on the obtained real memory address in response to a determination that the resource descriptor is loaded into a hardware.

13. The apparatus of claim 1, wherein the processor is further configured to:

process a resource associated with the resource descriptor; and store the processed resource based on the obtained real memory address, wherein to update the LUT with the obtained real memory address in the table entry associated with the dummy memory address, the processor is configured to:

update the LUT with the obtained real memory address in the table entry associated with the dummy memory address in response to processing the resource associated with the resource descriptor.

14. The apparatus of claim 1, wherein the processor is further configured to:

generate a second resource descriptor having a second dummy memory address associated with a second resource object;

store the second dummy memory address the LUT; and refrain from updating a second table entry of the LUT associated with the second dummy memory address.

15. The apparatus of claim 1, wherein the apparatus comprises a wireless communication device.

16. A method of graphics processing, comprising:

generating a resource descriptor having a dummy memory address associated with a resource object;

storing the dummy memory address in a look-up table (LUT);

obtaining a real memory address associated with the resource object; and updating the LUT with the obtained real memory address in a table entry associated with the dummy memory address.

17. The method of claim 16, further comprising:

obtaining an indication of the dummy memory address;

determining the real memory address based on the table entry of the LUT associated with the dummy memory address in response to the obtained indication; and retrieving resource data associated with the resource descriptor based on the determined real memory address.

18. The method of claim 17, wherein determining the real memory address based on the table entry of the LUT associated with the dummy memory address comprises:

reconstructing the real memory address based on a source field of the table entry and a destination field of the table entry, wherein the method further comprises:

determining that a set of most significant bits (MSBs) of the source field of the table entry are not all set, wherein reconstructing the real memory address based on the source field of the table entry and the destination field of the table entry is in response to the determination that the set of MSBs of the source field of the table entry are not all set.

19. The method of claim 16, wherein writing the dummy memory address to the LUT comprises:

writing the dummy memory address to a set of least significant bits (LSBs) of a source field of the table entry; and setting a set of most significant bits (MSBs) of the source field of the table entry, wherein the set of LSBs do not overlap with the set of MSBs, wherein updating the LUT with the obtained real memory address in the table entry associated with the dummy memory address comprises:

updating the set of MSBs of the source field of the table entry with a first portion of the obtained real memory address; and updating a destination field of the table entry with a second portion of the obtained real memory address.

20. A computer-readable medium non-transitory storing computer executable code, the code when executed by a processor, causes the processor to:

generate a resource descriptor having a dummy memory address associated with a resource object;

store the dummy memory address in a look-up table (LUT);

obtain a real memory address associated with the resource object; and update the LUT with the obtained real memory address in a table entry associated with the dummy memory address.

* * * * *